United States Patent
Soldani et al.

(10) Patent No.: US 6,616,956 B2
(45) Date of Patent: Sep. 9, 2003

(54) PREVENTING STICKINESS OF HIGH-BOILED CONFECTIONS

(75) Inventors: Cristiana Soldani, Milan (IT); Andrew Steve Whitehouse, Harrogate (GB); John Michael Leadbeater, Strensall-York (GB)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 09/725,132

(22) Filed: Nov. 29, 2000

(65) Prior Publication Data

US 2001/0003005 A1 Jun. 7, 2001

(30) Foreign Application Priority Data

Dec. 2, 1999 (GB) ............................................. 9928527

(51) Int. Cl.[7] ................................................. A23G 3/00
(52) U.S. Cl. ........................ 426/103; 426/302; 426/306; 426/609; 426/660
(58) Field of Search ................................ 426/103, 306, 426/302, 609, 660

(56) References Cited

U.S. PATENT DOCUMENTS

| | | | |
|---|---|---|---|
| 3,796,816 A | 3/1974 | Hasman et al. | 426/201 |
| 4,158,064 A | 6/1979 | Banowitz | 426/76 |
| 4,192,898 A | * 3/1980 | Hanson, Sr. | 426/250 |
| 4,208,432 A | 6/1980 | Noborio et al. | 426/4 |
| 4,238,510 A | 12/1980 | Cherukuri et al. | 426/5 |
| 4,275,083 A | 6/1981 | Colten et al. | 426/96 |
| 4,317,838 A | 3/1982 | Cherukuri et al. | 426/5 |
| 4,317,839 A | 3/1982 | Mitchell et al. | 426/96 |
| 4,408,041 A | 10/1983 | Hirao et al. | 536/4.1 |
| 4,623,543 A | 11/1986 | Motegi et al. | 426/103 |
| 4,647,463 A | 3/1987 | Hoover | 426/291 |
| 4,654,220 A | * 3/1987 | Heine et al. | 426/609 |
| 4,758,660 A | 7/1988 | Takeuchi et al. | 536/1.1 |
| 4,789,559 A | 12/1988 | Hirao et al. | 426/658 |
| 5,023,102 A | 6/1991 | Given, Jr. | 426/610 |
| 5,102,664 A | 4/1992 | Day | 424/440 |
| 5,503,866 A | * 4/1996 | Wilhelm, Jr. | 426/609 |
| 5,741,505 A | * 4/1998 | Beyer et al. | 424/439 |

FOREIGN PATENT DOCUMENTS

| | | |
|---|---|---|
| BE | 884317 A | 1/1981 |
| EP | 0 835 612 A2 | 4/1998 |
| GB | 2 079 129 A | 1/1982 |
| GB | 2 115 672 A | 9/1983 |
| JP | 49001543 B | 1/1974 |
| JP | 62257347 A | 11/1987 |
| JP | 363074451 A * | 4/1988 |
| JP | 401037249 A * | 2/1989 |
| RU | 447146 A | 12/1974 |
| WO | WO 91/07100 | 5/1991 |
| WO | WO 92/01386 | 2/1992 |
| WO | WO 97/03569 | 2/1997 |

OTHER PUBLICATIONS

*Confectionery Production*, 62 (9), 40, 1996.
S.C. Cummings, "Manufacture of High–Boiled Sweets," Sugar confectionery manufacture, pp. 129–169; 2nd Ed., Publisher: Blackie, Glasgow, 1995.
Sweetmaker, "The Manufacture of Sugar Confectionery," *Confectionery Production*, 53 (4), 342, 1987.

* cited by examiner

*Primary Examiner*—Nina Bhat
(74) *Attorney, Agent, or Firm*—Winston & Strawn

(57) ABSTRACT

A coated high-boiled confection and a method for making the coated high-boiled confection. The coated high-boiled confection includes a coating of a solid fat or fat derivative, having a melting point of from about 25° C. to 65° C., that is applied directly to the surface of the high-boiled confection. The coating is applied to the surface by melting the coating, applying the coating to the surface of the high-boiled confection, and cooling the high-boiled confection to solidify the coating on the high-boiled confection. The coating reduces the stickiness of the high-boiled confection.

19 Claims, No Drawings

PREVENTING STICKINESS OF HIGH-BOILED CONFECTIONS

FIELD OF THE INVENTION

The present invention relates to a coated high-boiled confection with a reduced surface stickiness and a process for its preparation.

BACKGROUND OF THE INVENTION

High-boiled sweets have a hard texture, a glassy appearance, and are usually produced from a sugar and glucose syrup base with a wide range of additives to give a pleasing taste. Examples of high-boiled sweets include lollipops, rock (lettered), glacier mints, medicated confectioneries, and the like. A disadvantage of such products is that they are generally highly hygroscopic and readily pick up moisture causing them to stick to wrappers, hands, surfaces, and to one another, all of which is inconvenient to the consumer.

Previous attempts to overcome these problems have involved the use of powdered anti-stick agents such as alpha-lactose, beta-lactose, calcium carbonate, titanium dioxide, talc, and the like that has been coated with solid monoglycerides of a saturated fatty acid having 12 to 18 carbon atoms and mono- or di-acetylation products thereof. For example, monostearo-monoacetyl glyceride or monolauro-diacetylglyceride in amounts of from 2 to 5% or more by weight based on the weight of the anti-stick agent has been used. U.S. Pat. No. 4,208,432 describes such anti-stick agents and states that they can prevent sticking for two weeks at 35° C. and at a relative humidity of 80%. There is, however, a need for improved methods for reducing the stickiness of high-boiled confections.

SUMMARY OF THE INVENTION

The invention relates to a coated high-boiled confection comprising a high-boiled confection and a coating comprising a solid fat or fat derivative having a melting point of about 25° C. to 65° C. applied directly to the high-boiled confection.

The solid fat or fat derivative may be one or more of an acetoglyceride, cocoa butter, a wax preparation, a refined, or a fractionated fat In one embodiment the solid fat or fat derivative is an acetoglyceride and may be a palm-based acetoglyceride. The solid fat or fat derivative also may be cocoa butter.

The amount of coating may be from about 0.01 to 0.1 percent by weight based on the weight of the coated high-boiled confection. The coating may further include an emulsifier. The emulsifier may be a solid monoglyceride of a saturated fatty acid having 12 to 18 carbon atoms such as glyceryl monostearate.

The invention further relates to a method of coating a high-boiled confection. The method involves the steps of providing a high-boiled confection, applying a solid fat or fat derivative having a melting point of about 25° C. to 65° C. that has been melted directly to the surface of the high-boiled confection, and cooling the melted solid fat or fat derivative to solidify the solid fat or fat derivative on the high-boiled confection to provide a coated high-boiled confection. The coating may be applied by spraying or with a brush coater or it may be applied by spraying followed by brush coating. The method may include the additional step of finishing the coating with warn air using a step drum to provide a homogenous coating.

DETAILED DESCRIPTION OF THE PREFERRED EMBODIMENTS

We have found that by using a coating comprising a solid fat or fat derivative having a melting point of from 25° C. to 65° C., the coating may be used in amounts more than 20 times less than previously used, and may be transparent and tasteless while still providing coated high-boiled confections which have substantially reduced stickiness compared with non-coated high-boiled confections.

Accordingly, the present invention provides a coated high-boiled confection characterized in that the coating comprises a solid fat or fat derivative having a melting point of from 25° C. to 65° C. that is applied directly to the surface of the high-boiled confection. The high-boiled confection of the invention is unlike prior high-boiled confections in that the fat or fat derivative is applied directly to the surface of the high-boiled confection. In contrast, prior art high-boiled confections are coated with a powdered anti-stick agent that has been coated with solid monoglycerides of a saturated fatty acid having 12 to 18 carbon atoms and mono- or di-acetylation products thereof.

The term "fat derivative" as used herein means a chemically modified fat. Chemically modified fats are fats that have had their chemical structure altered or modified by various processes including, but not limited to, hydrogenation, inter-esterification, and re-esterification.

The solid fat or fat derivative used in the coating may be, for instance, an acetoglyceride, cocoa butter, a wax preparation, or a refined or fractionated fat. The acetoglyceride may be from any suitable source such as soy, but is preferably an oil palm-based acetoglyceride.

The term "acetoglyceride," as used herein means a monoglyceride that has been acetylated with acetic acid or a derivative of acetic acid.

The melting point of the fat derivative is preferably from about 27.5° C. to 45° C. and more preferably from about 30° C. to 40° C.

The amount of coating may be from about 0.01 to 0.1% by weight, preferably from about 0.015 to 0.08% by weight, and more preferably from 0.02 to 0.04% by weight based on the weight of the coated high-boiled confection.

If desired, the coating may also be, or may contain, an emulsifier. For example, the emulsifier may be a solid monoglyceride of a saturated fatty acid having 12 to 18 carbon atoms, such as glyceryl monostearate. The emulsifier may be in combination with a fat in any proportion.

The present invention also provides a method of coating a high-boiled confection which comprises spreading the coating in melted form, or as a powder which is subsequently fused, over the surface of the high-boiled confection and cooling to solidify the coating. The solidification may be by crystallization.

The coating may conveniently be applied by spraying or by a brush coater. Alternatively, the coating may applied by spraying followed by brush coating. Once the coating has been applied to the surface of the high-boiled confection, preferably in the form of an even dispersion, further processing may be carried out to give a more homogeneous dispersion and a thinner layer, e.g. by using a step drum with warm air.

The coated high-boiled confections produced according to the present invention are less sticky, absorb less moisture and have less cold flow deformation when compared with uncoated high-boiled confections. Because of the reduced stickiness, they are more easily released from their wrappers. In addition, they have an increased resistance to high temperature and humidity which enables them to be transported greater distances, and/or stored for longer times, e.g., up to about one year under tropical conditions while remaining in a good state. The requirements of the wrapper are reduced by virtue of the coating providing a less sticky product which leads to cost savings. In some cases, the wrapper may be completely dispensed with.

EXAMPLES

The invention is further defined by reference to the following examples describing in detail the preparation of the high-boiled confection of the present invention. The examples are representative, and they should not be construed to limit the scope of the invention.

Example 1

Acidified hard-boiled sweets from factory production containing sucrose, glucose syrup, and lactic acid, were coated with 0.04% by weight of palm-based acetoglyceride having a melting point of 35° C. The palm-based acetoglyceride was melted at a temperature of approximately 50° C. and applied to the surface of the hard-boiled sweet by spraying followed by brush coating to give an even dispersion. Once the coating had been applied to the surface of the high-boiled confection, it was finished using a step drum with warm air to give a more homogeneous dispersion and a thinner layer.

The unwrapped sweets were stored at 20° C. and 65% relative humidity for 10 days after which the increase in weight was found to be 2.83%. The sweets started to become slightly sticky during day 6 and to exhibit a small amount of cold flow. Even after 10 days, the sweets were only slightly sticky with only a little cold flow at the bottom.

Comparative Example

Similar high-boiled sweets from the same batch as used in Example 1 were not coated and were stored at 20° C. and 65% relative humidity for 10 days. The increase in weight was found to be 6.62%, which is more than twice that of the coated high-boiled sweets of Example 1. The sweets started to become sticky during the first day and dissolved due to cold flow.

Example 2

Similar hard-boiled sweets were coated with 0.04% by weight of soya-based acetoglyceride having a melting point of 38° C. The soya-based acetoglyceride was melted at a temperature of approximately 50° C. and applied to the surface of the hard-boiled sweet by spraying followed by brush coating to give an even dispersion. Once the coating had been applied to the surface of the high-boiled confection, it was finished using a step drum with warm air to give a more homogeneous dispersion and a thinner layer.

The unwrapped sweets were stored at 20° C. and 65% relative humidity for 10 days after which the increase in weight was found to be 5.16%. Even after 10 days, the sweets were not sticky, however, the bottom was starting to dissolve.

Example 3

Hard-boiled sweets were coated with 0.1% by weight of cocoa butter. The cocoa butter was melted at a temperature of approximately 50° C. and applied to the surface of the hard-boiled sweet by spraying followed by brush coating to give an even dispersion. Once the coating had been applied to the surface of the high-boiled confection, it was finished using a step drum with warm air to give a more homogeneous dispersion and a thinner layer.

The unwrapped sweets were stored at 20° C. and 65% relative humidity for 10 days after which the increase in weight was found to be only 0.54%. Even after 10 days, the sweets were not sticky and there was no cold flow.

Example 4

Hard-boiled sweets were coated with 0.04% by weight of a fractionated vegetable fat composition. The fat was melted at a temperature of approximately 50° C. and applied to the surface of the hard-boiled sweet by spraying followed by brush coating to give an even dispersion. Once the coating had been applied to the surface of the high-boiled confection, it was finished using a step drum with warm air to give a more homogeneous dispersion and a thinner layer.

The unwrapped sweets were stored at 20° C. and 65% relative humidity for 10 days after which the increase in weight was found to be 2.55%. The sweets started to become sticky during the eighth day and exhibited a small amount of cold flow. After 10 days, the sweets were a only a slightly sticky with a small amount of cold flow at the bottom.

What is claimed is:

1. A coated high-boiled confection comprising a high-boiled confection and a coating comprising a solid fat or fat derivative having a melting point of about 25° C. to 65° C. applied directly to the high-boiled confection.

2. The coated high-boiled confection of claim 1, wherein the solid fat or fat derivative is one or more of an acetoglyceride, cocoa butter, a wax preparation, or a refined or a fractionated fat.

3. The coated high-boiled confection of claim 1, wherein the solid fat or fat derivative is an acetoglyceride.

4. The coated high-boiled confection of claim 3, wherein the solid fat or fat derivative is a palm-based acetoglyceride.

5. The coated high-boiled confection of claim 1, wherein the solid fat or fat derivative is cocoa butter.

6. The coated high-boiled confection of claim 1, wherein the amount of coating is from about 0.01 to 0.1 percent by weight based on the weight of the coated high-boiled confection.

7. The coated high-boiled confection of claim 1, wherein the coating further comprises an emulsifier.

8. The coated high-boiled confection of claim 7, wherein the emulsifier is a solid monoglyceride of a saturated fatty acid having 12 to 18 carbon atoms.

9. The coated high-boiled confection of claim 8, wherein the emulsifier is glyceryl monostearate.

10. The coated high-boiled confection of claim 1, wherein the coating is tasteless.

11. The coated high-boiled confection of claim 1, wherein the coating is transparent.

12. The coated high-boiled confection of claim 1, wherein the coating resists humidity sufficiently to permit storage for up to one year under tropical conditions while remaining in a good state.

13. A coated high-boiled confection comprising a high-boiled confection and a coating that is a solid fat or fat derivative having point of about 25°C. to 65°C. applied to the high-boiled confection.

14. The coated high-boiled confection of claim 13, wherein the coating is tasteless.

15. The coated high-boiled confection of claim 13, wherein the coating is transparent.

16. A method of coating a high-boiled confection comprising:

providing a high-boiled confection;

applying a solid fat or fat derivative having a melting point of about 25° C. to 65° C. that has been melted directly to a surface of the high-boiled confection; and cooling the melted solid fat or fat derivative to solidify the solid fat or fat derivative on the high-boiled confection to provide a coated high-boiled confection.

17. The method of claim 16, wherein the coating is applied by spraying or with a brush coater.

18. The method of claim 16, wherein the coating is applied by spraying followed by brush coating.

19. The method of claim 16, further comprising finishing the coating with warm air using a step drum to provide a homogenous coating.

* * * * *

UNITED STATES PATENT AND TRADEMARK OFFICE
CERTIFICATE OF CORRECTION

PATENT NO.    : 6,616,956 B2
DATED         : September 9, 2003
INVENTOR(S)   : Soldani et al.

It is certified that error appears in the above-identified patent and that said Letters Patent is hereby corrected as shown below:

<u>Title page,</u>
Item [*] Notice, change "by 0 days" to -- by 437 days --.

<u>Column 4,</u>
Line 62, after "derivative having" insert -- a melting --; and after "65°C. applied" insert -- directly --.

Signed and Sealed this

Sixth Day of January, 2004

JAMES E. ROGAN
*Director of the United States Patent and Trademark Office*